(12) United States Patent
Cowan

(10) Patent No.: US 8,905,000 B2
(45) Date of Patent: Dec. 9, 2014

(54) THROTTLE BODY ASSEMBLY

(75) Inventor: Nathan Cowan, Chatham (CA)

(73) Assignee: Continental Automotive Systems, Inc., Auburn Hills, MI (US)

( * ) Notice: Subject to any disclaimer, the term of this patent is extended or adjusted under 35 U.S.C. 154(b) by 518 days.

(21) Appl. No.: 13/335,327

(22) Filed: Dec. 22, 2011

(65) Prior Publication Data

US 2013/0160738 A1  Jun. 27, 2013

(51) Int. Cl.
  *F02D 9/10*  (2006.01)
  *G01D 5/14*  (2006.01)

(52) U.S. Cl.
  USPC ............................................ 123/399; 123/337

(58) Field of Classification Search
  CPC ............ F02D 9/105; F02D 2009/0294; F02D 2009/0213; G01D 5/145
  USPC ................. 123/346, 376–378, 391, 396, 398, 123/399–403; 73/114.26, 114.36
  See application file for complete search history.

(56) References Cited

U.S. PATENT DOCUMENTS 7,007,666 B2 *  3/2006  Kamimura et al. ............ 123/399
7,845,616 B2 *  12/2010  Hatsuzawa et al. ...... 251/129.11
8,044,659 B2 *  10/2011  Ikeda et al. ............... 324/207.25
2004/0135574 A1 *  7/2004  Hagio et al. .............. 324/207.25
2004/0231644 A1  11/2004  Ikeda et al.
2005/0073299 A1  4/2005  Yoshikawa
2012/0032670 A1 *  2/2012  Ikeda et al. ............... 324/207.25
2012/0304964 A1 *  12/2012  Nemoto et al. ................ 123/399
2013/0233277 A1 *  9/2013  Uchiyama et al. ............ 123/337

FOREIGN PATENT DOCUMENTS

EP  1850094 A2  10/2007

OTHER PUBLICATIONS

Search Report and Written Opinion of the International Searching Authority PCT/US2012/070015.

* cited by examiner

*Primary Examiner* — Thomas Moulis
*Assistant Examiner* — Elizabeth Hadley

(57) ABSTRACT

Improved throttle body assemblies are described. More particularly, throttle body assemblies having improved throttle position sensor assemblies are described. In one aspect, a throttle body assembly for providing controlled aspiration to an engine is described. The assembly comprises a throttle body housing defining a throttle bore for receiving a throttle plate. The throttle plate is actuatable by an electric motor. The assembly further comprises a throttle position sensor configured to monitor positions of the throttle plate. The throttle assembly further comprises an electric discharge path formed between the throttle position sensor and the throttle body housing, wherein the electric discharge path substantially prevents the accumulation of residual electric charge across the throttle position sensor.

16 Claims, 3 Drawing Sheets

US 8,905,000 B2

THROTTLE BODY ASSEMBLY

TECHNICAL FIELD

This patent relates to improved throttle body assemblies. More particularly, the patent relates to throttle body assemblies having improved throttle position sensor assemblies.

BACKGROUND OF THE INVENTION

Throttle body assemblies provide aspiration to engines. The aspiration to these engines is controlled through a throttle plate disposed in a bore of the throttle body assemblies. The throttle plate is manipulated by a user of the engine to cause increase or decrease airflow to the engine thereby controlling power output.

As part of an overall engine control system, and in certain applications a vehicle control system, the operation of the throttle body assembly is monitored to provide vital information to the control system. For example, as part of an overall monitoring system of an engine, it is desirous to monitor the position of a throttle plate to ensure that the throttle body assembly is functional and performing properly. Also, by determining the position of the throttle plate it is possible to determine efficiency of the engine by comparing anticipated power output to actual power output. Other information can be determined, as well.

In the past, positions of throttle plates have been determined using throttle position sensors. These sensors utilized induction formed between a component of the throttle plate and a sensor. More particularly, a sensor element is mounted to a shaft, in which the throttle plate has been mounted to, and is placed in an inductive relationship with an inductive rotary position sensor such that position of the sensor element relates to a position of the throttle plate.

Unfortunately, due to its electrical components and inductive relationship the throttle position sensor is susceptible to spikes in electric currents and/or voltages. Such spikes are often inherent to the operation or maintenance of an engine. For example, static electricity generated by airflow through the throttle body assembly, an engine maintenance person's touch, or otherwise, has the potential to generate a spark with a sensor, which can potentially cause damage to electric components. Also, the accumulation of potential energy such as residual electric charge and the discharge of such potential energy can effect measurements and operation of the throttle position sensor.

Prior throttle position sensors have attempted to solve this problem by developing complicated grounding means for the sensor. However, not only have these arrangements added considerable cost to the throttle body assembly, but the also transfer of accumulated charge across the sensor can be potentially damaging to the sensors. Also, some systems allow for periodic discharge of accumulated charge; however, it has been recently discovered that the elimination of any charge across the sensor increases accuracy of the throttle position sensor.

In view of the foregoing, there is a need for improved methods and devices to reduce or eliminate potential damage to a throttle position sensor caused by the accumulation and discharge of residual electric charge.

DETAILED DESCRIPTION

Figure 1:
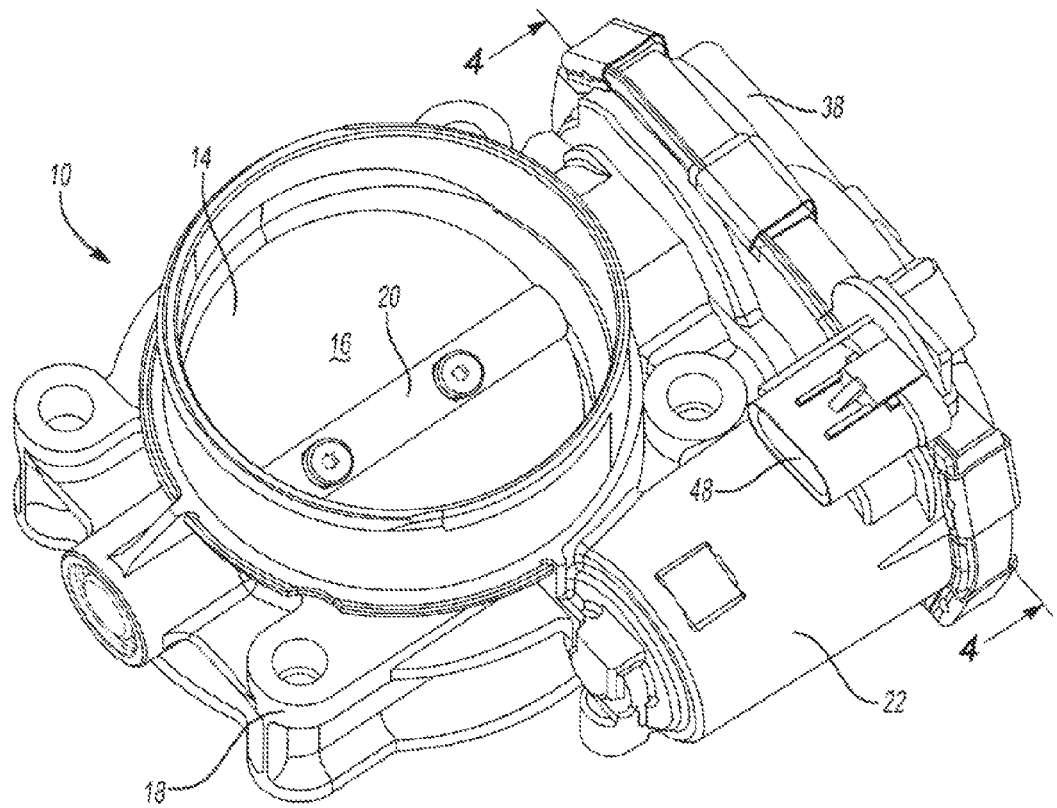
FIG. 1 comprises a perspective view of a throttle body assembly according to various embodiments of the present invention.
Figure 2:
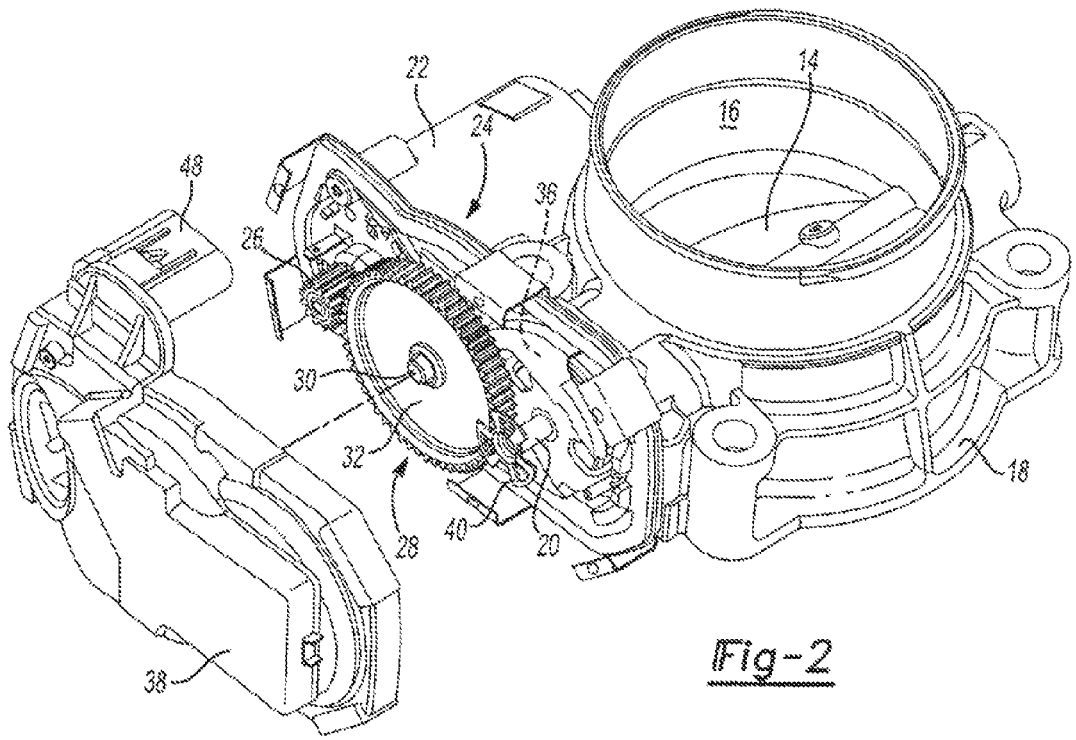
FIG. 2 comprises a partial exploded perspective view of the throttle body assembly shown in FIG. 1.

Improved methods and devices for monitoring operation of throttle body assemblies are provided. In particular, improved throttle body assemblies that reduce buildup and large discharge of residual electric charge, e.g. electrostatic energy or otherwise, across and through a throttle position sensor are provided. In some aspects, the discharge is continual and limits or prevents the flow of discharge current through electrically sensitive components such as a sensor board of the throttle position sensor assembly, or otherwise.

In some aspects, a throttle body assembly for providing controlled aspiration to an engine comprises a throttle body housing defining a throttle bore for receiving a throttle plate. The throttle plate is actuatable by an electric motor. The assembly further comprises a throttle position sensor configured to monitor positions of the throttle plate. The throttle assembly further comprises an electric discharge path formed between the throttle position sensor and the throttle body housing, wherein the electric discharge path substantially prevents the accumulation of residual electric charge across the throttle position sensor.

In some aspects, a throttle body assembly for providing controlled aspiration comprises a throttle body housing defining a throttle bore for receiving a throttle plate, the throttle plate being actuatable by an electric motor. The assembly further comprises a gear assembly transferring rotational drive from the electric motor to the throttle plate. The gear assembly comprises an intermediate gear assembly configured to transfer rotational drive from the electric motor to the throttle plate, the intermediate gear assembly being mounted to a pin. The assembly further comprises a throttle position sensor assembly comprising a sensor element attached to a shaft of the throttle plate and an inductive rotary position sensor placed in inductive relationship with the sensor element. The throttle position sensor assembly is adapted to monitor the position of the sensor element. The assembly further comprises an electric discharge path formed between the throttle position sensor assembly and the pin, wherein the electric discharge path substantially prevents the accumulation of residual electric charge across the throttle position sensor.

In some aspects, a method of continual discharge of residual electric charge of a throttle position sensor of a throttle body assembly comprises the steps of providing a throttle body assembly configured for aspirating an engine. The throttle body assembly comprises a throttle body housing defining a throttle bore for receiving a throttle plate. The throttle plate is actuatable by an electric motor. The throttle body assembly further comprises a gear assembly having an intermediate gear assembly configured to transfer rotational drive from the electric motor to the throttle plate. The intermediate gear assembly is mounted to a pin. The method further comprises providing a throttle position sensor assembly comprising a sensor element attached to a shaft of the throttle plate and a inductive rotary position sensor placed in inductive relationship with the sensor element. The throttle position sensor assembly is adapted to monitor the position of the sensor element and throttle plate. The method further comprises electrically connecting the throttle position sensor to the pin of the intermediate gear assembly to form an electric discharge path, wherein the electric discharge path substantially prevents the accumulation of residual electric charge across the throttle position sensor.

Referring to FIGS. 1 through 6, an exemplary throttle body assembly 10 and throttle position sensor assembly 12 of the present invention is shown. The throttle body assembly 10 comprises a throttle plate 14 rotatably disposed in a throttle bore 16 formed through a throttle body housing 18. The throttle plate 14 is formed with or attached to a throttle shaft 20 which provides rotational attachment to the throttle body housing 18. The throttle plate 14 is rotatably moveable between an open position, where there is little impedance to the flow of air through the throttle bore 16, and a closed position, where there is substantial impedance to the flow of air through the throttle bore.

The throttle plate 14 is electrically driven by an electric motor 22, through a gear assembly 24. The gear assembly 24 comprises an electric motor gear 26 that provides rotational driving force to an intermediate gear assembly 28, which acts as a slave gear assembly, and is mounted to intermediate pin 30 which is supported by the throttle body housing 28. The intermediate gear assembly 28 comprises a first intermediate gear 32, which is in contact with electric motor gear 26, and a second intermediate gear 34, which is in contact with and provides driving force to a throttle plate gear 36, which is mounted to throttle shaft 20. The gear assembly is protected and covered by gear cover 38.

Referring more particularly to FIGS. 3 through 6, the throttle body assembly 10 comprises throttle position sensor assembly 12 that is configured to monitor operation of the throttle body assembly 10. More particularly, the throttle position sensor assembly 12 monitors the position of the throttle plate 14 so that the relative open and closed position can be determined. By determining the relative open and closed position of the throttle plate 14 it is possible to confirm functionality of the throttle body assembly 10 and also calculate anticipated air flow to an associated engine to further determine performance, efficiency, or otherwise, of the engine. The positioning of the throttle plate 14 may also be used for other purposes such as for controlling the electric motor 22 or otherwise.

In some aspects, the throttle position sensor assembly 12 comprises an inductive rotary position sensor. In this embodiment, the throttle position sensor assembly 12 comprises a sensor element 40 that is disposed with respect to an inductive rotary position sensor 42 so as to be in an electrically inductive relationship therewith. In this configuration, the inductive rotary position sensor 42 detects movement and position of the sensor element 40, which is compared to reference data to determine the position of the throttle plate 14.

Figure 4:
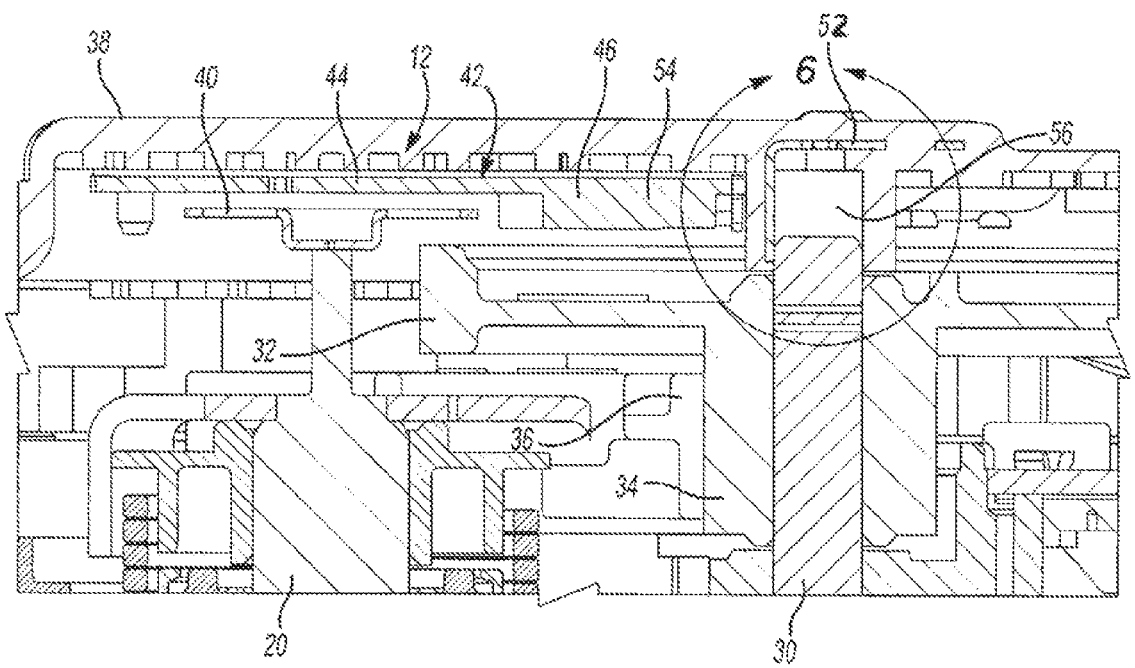
FIG. 4 comprises a cross-sectional view taken along line 4-4 of the throttle body assembly shown in FIG. 1.
Figure 5:
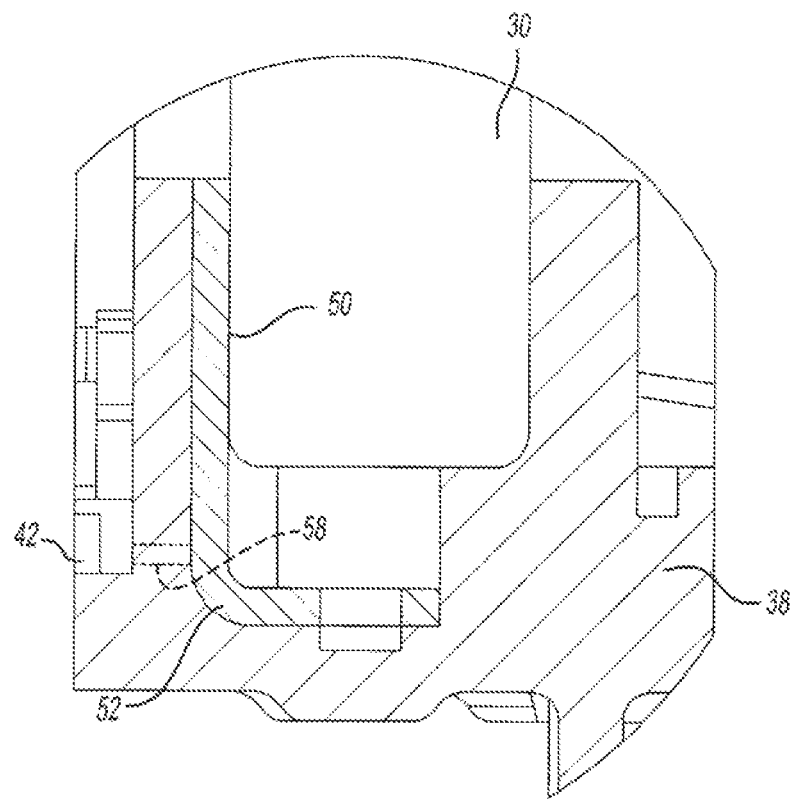
FIG. 5 comprises an enlarged cross-sectional view of the throttle body assembly shown in FIG. 3.
Figure 6:
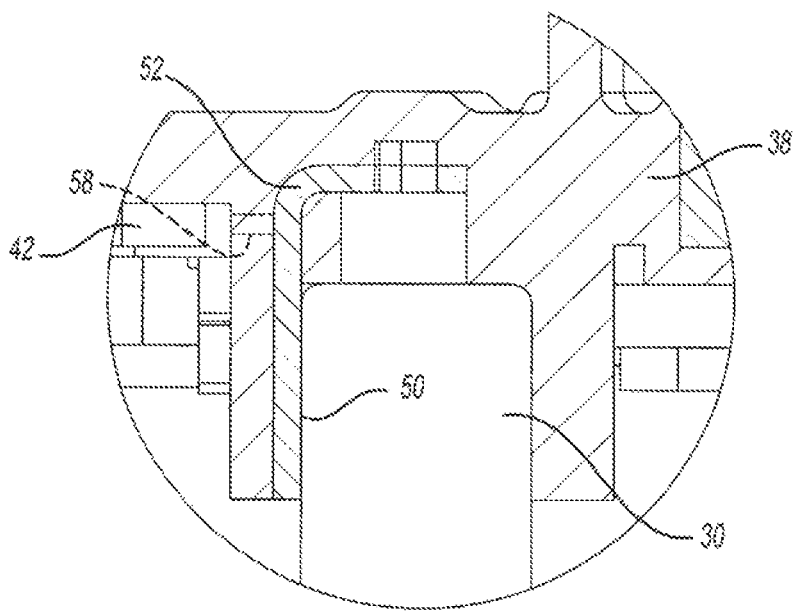
FIG. 6 comprises another enlarged cross-sectional view of the throttle body assembly shown in FIG. 4.

Referring to FIG. 4, the sensor element 40 is attached to the throttle shaft using any suitable means, such as welding or otherwise. As the throttle plate 14 is moved between an open position and closed position the sensor element 40 moves as well. Accordingly, movement and position of the sensor element 40 is directly related to movement and position of the throttle plate 14.

Figure 3:
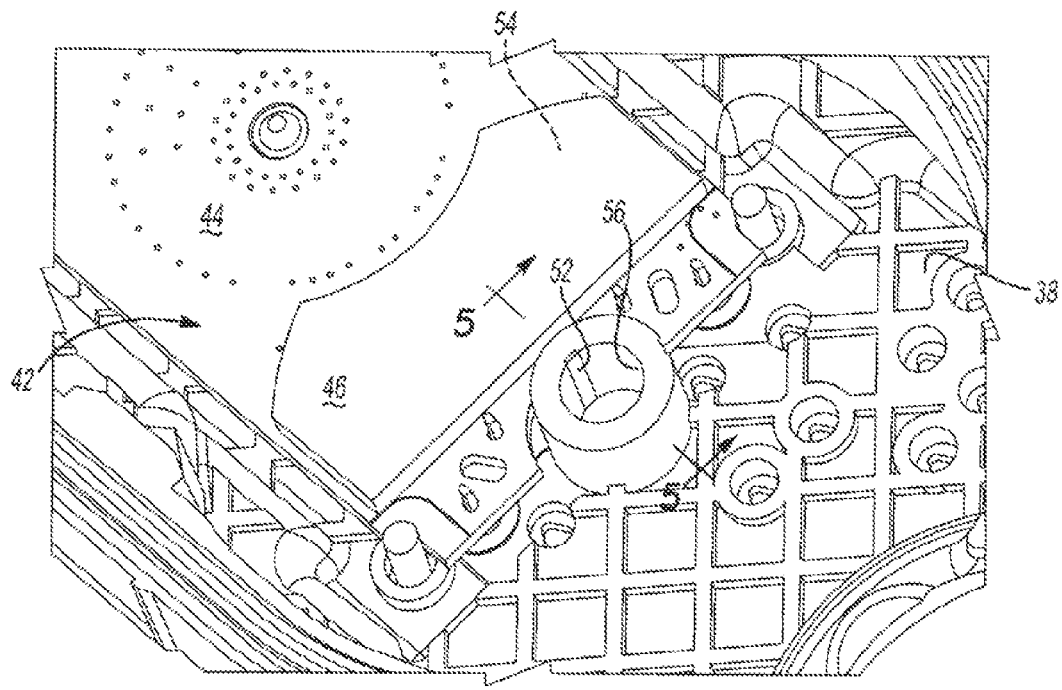
FIG. 3 comprises a perspective view of an interior portion of a gearbox cover shown in FIG. 1.

Referring to FIGS. 3 and 4, the inductive rotary position sensor 42 is disposed in an inductive relationship to the sensor element 40. In the configuration shown, the inductive rotary position sensor 42 is mounted to the gear cover 38 of the throttle body assembly 10 using suitable attachment means.

The inductive rotary position sensor 42 comprises a sensor board 44 that is in communication with a sensor processor 46. In this configuration, as the sensor element 40 moves different inductive readings are observed across the sensor board 44, which are transferred to the sensor processor 46, which further processes the signals and transmits them to a monitor or control unit of the throttle body assembly, or engine, through connector 48.

As previously mentioned, one particular problem with prior throttle body assemblies, and more particularly throttle position sensor assemblies, is the effect accumulated residual electric charge has on the stability of the sensor.

Referring to FIGS. 3 through 6, means for grounding the throttle position sensor assembly 10 so as to dissipate electric charge, such as electrostatic or otherwise are provided. In some aspects, the throttle position sensor is continually or substantially continually grounded so that there is substantially no build up of electric charge, e.g. electrostatic or otherwise, across the throttle position sensor assembly.

In some aspects, the electric charge is dissipated through an electric discharge path 50 that limits or prevents unwanted current or voltage from flowing or building over, or through, particularly electrically sensitive components, such as sensor board 44. For example, some aspects provide electric discharge paths 50 that are formed opposite the sensor board 44 or are formed between the sensor processor 46 and ground components, e.g. throttle body housing 18, intermediate pin 30 or otherwise. Other configurations are possible.

With respect to particular components which the throttle position sensor assembly 12 is grounded to, in some aspects, the throttle position sensor assembly 12 forms an electric discharge path 50 between the throttle position sensor assembly 12 and the throttle body housing 18. In some aspects, the electric discharge path 50 is formed between is formed between the throttle position sensor assembly 12 and the intermediate pin 30. In some aspects, the electric discharge path 50 is formed between an electric lead frame 52 of the throttle position sensor assembly 12 and the intermediate pin 30.

In some aspects, the lead frame 52 is connected to the sensor processor 46, via electrical connection 58, and more particularly to a ground circuit 54 formed therein. The lead frame 52 is over molded during formation of the gear cover 38. In some aspects, the lead frame 52 is welded or otherwise attached to throttle position sensor assembly 12, after attachment of the throttle position sensor assembly to the gear cover 38, via electric connection 58.

In some aspects, the lead frame 52 is directly connected to an electrically conductive component to ground the throttle position sensor assembly 12. In this configuration the electric discharge path 50 comprises a connection point formed between the lead frame 52 and conductive components. For example, referring to FIGS. 5 and 6, the lead frame 52 is in contact with the intermediate pin 30 wherein the lead frame 52 is continually pressed against the intermediate pin 30, particularly during rotation of the pin, i.e. opening and closing of the throttle plate 14. In an example a press-fit is formed between the lead frame 52 and intermediate pin 30. In another example the lead frame is connected to or comprises a spring member, e.g. torsion spring, clock spring, tension spring, compression spring, or otherwise, to maintain contact with intermediate pin 30. Other configurations are possible.

In some aspects, the lead frame 52 is disposed in a recess 56, which is configured for receiving intermediate pin 30 and to provide support to the pin. In this configuration, the lead frame 52 is juxtaposed to a bore of recess 56 and upon insertion is in continual contact with the intermediate pin 30 to form electric discharge path 50.

In operation, referring to FIGS. 1 through 6, the electric motor 22 opens and closes the throttle plate 14 within throttle bore 15, via gear assembly 24. As the throttle plate 14 is rotated to various positions, based upon a users desired power output of an associate engine, the sensor element also rotates causing inductive currents across the sensor board 44 of inductive rotary position sensor 42. Information pertaining to the location of the inductive currents is relayed to the sensor processor 46 wherein the signal is processed and further relayed to a throttle body assembly or engine monitoring and/or control unit, via connector 58.

During operation, maintenance or other occurrences, any potential accumulation of voltage over the throttle body assembly 10, e.g. electrostatic energy or otherwise, is immediately discharged to the conductive throttle body housing 18, and corresponding engine, through metal intermediate pin 30 and metallic lead frame 52. As previously indicated, not only does this prevent discharge current from going through the sensor board 44 of inductive rotary position sensor 42, but also increases accuracy and performance of the various electric components of the throttle position sensor assembly 12.

Preferred embodiments of this invention are described herein, including the best mode known to the inventors for carrying out the invention. It should be understood that the illustrated embodiments are exemplary only, and should not be taken as limiting the scope of the invention. It will also be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

What is claimed is:

1. A throttle body assembly for providing controlled aspiration to an engine, the assembly comprising:
    a throttle body housing defining a throttle bore for receiving a throttle plate, the throttle plate being actuatable by an electric motor;
    a throttle position sensor configured to monitor positions of the throttle; and
    an electric discharge path formed between the throttle position sensor and the throttle body housing,
    wherein the electric discharge path substantially prevents the accumulation of residual electric charge across the throttle position sensor plate, the throttle position sensor is electrically connected to the throttle body housing to provide continual dissipation of the residual electric charge, the throttle position sensor comprises an electric ground circuit for dispersing the residual electric charge of the throttle position sensor, the ground circuit comprising a lead frame that is electrically connected to the throttle body housing, the lead frame extends from the throttle position sensor, and the lead frame is electrically connected to a pin which provides rotational support to one or more gears of the throttle body assembly, the one or more gears of the throttle body being configured to transmit rotational driving force between the electric motor and the throttle plate.

2. The throttle body assembly of claim 1, wherein the lead frame is disposed in a recess configured to receive the pin.

3. The throttle body assembly of claim 2, wherein lead frame acts as a spring to provide continual contact with the pin.

4. The throttle body assembly of claim 3, wherein the pin is press-fit against the lead frame.

5. The throttle body assembly of claim 1, wherein the electric discharge path is electrically disposed between a sensor processor of the throttle position sensor and the throttle body housing.

6. The throttle body assembly of claim 5, wherein the electric discharge path is electrically disposed between a sensor processor of the throttle position sensor and the pin.

7. The throttle body assembly of claim 6, wherein the electric discharge path is disposed such that during discharge of residual electric charge substantially no additional current or voltage is encountered by a sensor board of the throttle position sensor assembly.

8. The throttle body assembly of claim 7, wherein the electric discharge path is disposed on an opposite side of the throttle position sensor assembly than the sensor board.

9. A throttle body assembly for providing controlled aspiration to an engine, the assembly comprising:
    a throttle body housing defining a throttle bore for receiving a throttle plate, the throttle plate being actuatable by an electric motor;
    a gear assembly transferring rotational drive from the electric motor to the throttle plate, the gear assembly comprising an intermediate gear assembly configured to transfer rotational drive from the electric motor to the throttle plate, the intermediate gear assembly being mounted to a pin;
    a throttle position sensor assembly comprising a sensor element attached to a shaft of the throttle plate and a inductive rotary position sensor placed in inductive relationship with the sensor element, the throttle position sensor assembly being adapted to monitor the position of the sensor element; and
    an electric discharge path formed between the throttle position sensor assembly and the pin,
    wherein the electric discharge path substantially prevents the accumulation of residual electric charge across the throttle position sensor.

10. The throttle body assembly of claim 9, wherein the throttle position sensor comprises an electric ground circuit for dispersing the residual electric charge of the throttle position sensor, the ground circuit comprising a lead frame that extends from the throttle position sensor and is electrically connected to the pin.

11. The throttle body assembly of claim 9, wherein the lead frame is disposed in a recess configured to receive and support the pin, the lead frame being under substantial continual pressure against the pin.

12. The throttle body assembly of claim 9, wherein the electric discharge path is disposed on an opposite side of the throttle position sensor assembly than a sensor board such that during discharge of residual electric charge substantially no additional current or voltage is encountered by the sensor board.

13. A method of continual discharge of residual electric charge of a throttle position sensor of a throttle body assembly, comprising the steps of:
    providing a throttle body assembly configured for aspirating an engine, the throttle body assembly comprising a throttle body housing defining a throttle bore for receiving a throttle plate, the throttle plate being actuatable by an electric motor, the throttle body assembly further comprising a gear assembly having an intermediate gear assembly to transfer rotational drive from the electric motor to the throttle plate, the intermediate gear assembly being mounted to a pin;
    providing a throttle position sensor assembly comprising a sensor element attached to a shaft of the throttle plate and a inductive rotary position sensor placed in inductive relationship with the sensor element, the throttle position sensor assembly being adapted to monitor the position of the sensor element; and electrically connecting the throttle position sensor to the pin of the intermediate gear assembly to form an electric discharge path, wherein the electric discharge path substantially prevents the accumulation of residual electric charge across the throttle position sensor.

14. The method of claim 13, wherein the throttle position sensor comprises an electric ground circuit for dispersing the residual electric charge of the throttle position sensor, the ground circuit comprising a lead frame that extends from the throttle position sensor and is electrically connected to the pin.

15. The method of claim 13, wherein the lead frame is disposed in a recess configured to receive the pin, the lead frame being under substantial continual pressure against the pin.

16. The method of claim 13, wherein the electric discharge path is disposed on an opposite side of the throttle position sensor assembly than a sensor board such that during discharge of residual electric charge substantially no additional current or voltage is encountered by the sensor board.

* * * * *